(12) United States Patent
Stowell et al.

(10) Patent No.: US 10,597,511 B2
(45) Date of Patent: Mar. 24, 2020

(54) REACTIVE FLAME RETARDANT BLENDS FOR FLEXIBLE POLYURETHANE FOAM

(71) Applicant: ICL-IP America Inc., Tarrytown, NY (US)

(72) Inventors: Jeffrey Stowell, Wingdale, NY (US); Zhihao Chen, Floral Park, NY (US); Munjal Patel, Lindenhurst, IL (US)

(73) Assignee: ICL-IP America Inc., Tarrytown, NY (US)

(*) Notice: Subject to any disclaimer, the term of this patent is extended or adjusted under 35 U.S.C. 154(b) by 0 days.

(21) Appl. No.: 16/041,982

(22) Filed: Jul. 23, 2018

(65) Prior Publication Data

US 2019/0085151 A1 Mar. 21, 2019

Related U.S. Application Data

(60) Provisional application No. 62/561,365, filed on Sep. 21, 2017.

(51) Int. Cl.
| | | |
|---|---|---|
| *C08K 5/00* | (2006.01) | |
| *C08K 5/53* | (2006.01) | |
| *C08G 18/32* | (2006.01) | |
| *C08G 18/28* | (2006.01) | |
| *C08G 18/42* | (2006.01) | |
| *C08G 18/18* | (2006.01) | |
| *C08G 18/76* | (2006.01) | |

(Continued)

(52) U.S. Cl.
CPC .......... *C08K 5/0066* (2013.01); *C08G 18/18* (2013.01); *C08G 18/288* (2013.01); *C08G 18/3203* (2013.01); *C08G 18/4241* (2013.01); *C08G 18/7621* (2013.01); *C08K 5/53* (2013.01); *C08G 2101/0008* (2013.01); *C08G 2350/00* (2013.01); *C08K 5/521* (2013.01); *C08K 5/5313* (2013.01)

(58) Field of Classification Search
None
See application file for complete search history.

(56) References Cited

U.S. PATENT DOCUMENTS

| | | | |
|---|---|---|---|
| 2,372,244 A | | 3/1945 | Adams et al. |
| 3,249,562 A | * | 5/1966 | Worsley ............ C08G 18/3878 521/168 |

(Continued)

FOREIGN PATENT DOCUMENTS

| | | |
|---|---|---|
| GB | 1083939 A1 | 9/1967 |
| GB | 1215106 A1 | 12/1970 |

(Continued)

OTHER PUBLICATIONS

Zhurnal Obshchei Khimi; Sep. 18, 1971.

(Continued)

*Primary Examiner* — Joseph D Anthony
(74) *Attorney, Agent, or Firm* — Dilworth & Barrese, LLP (57) ABSTRACT

The present invention provides dialkyl phosphorus-containing compounds, namely reactive mono-hydroxyl-functional dialkyl phosphinates in a blend with a phosphate compound, said blend serving as highly efficient reactive flame retardant blend in flexible polyurethane foam. The invention further provides fire-retarded polyurethane compositions comprising said the reaction product of the flame retardant blend with polyol and isocyanate foam forming components.

15 Claims, 2 Drawing Sheets

(51) Int. Cl.
   *C08G 101/00* (2006.01)
   *C08K 5/521* (2006.01)
   *C08K 5/5313* (2006.01)

(56) References Cited

U.S. PATENT DOCUMENTS

| | | | |
|---|---|---|---|
| 3,317,638 A | | 5/1967 | Hartman et al. |
| 3,597,509 A | | 8/1971 | Haus-Eberhard et al. |
| 3,639,532 A | | 2/1972 | Oertel et al. |
| 3,644,595 A | | 2/1972 | Wu |
| 4,163,034 A | * | 7/1979 | Dursch .................. C08G 79/04 558/104 |
| 4,220,610 A | * | 9/1980 | Dursch .................. C07F 9/4075 427/393.3 |
| 4,250,124 A | * | 2/1981 | Dursch .................. C07F 9/3211 558/118 |
| 4,407,981 A | * | 10/1983 | Aaronson .......... C08G 18/2885 521/107 |
| 6,090,968 A | | 7/2000 | Horold et al. |
| 10,208,187 B2 | * | 2/2019 | Piotrowski ......... C08G 18/7621 |
| 2011/0201733 A1 | | 8/2011 | Hill et al. |
| 2011/0213062 A1 | | 9/2011 | Hill et al. |
| 2011/0224339 A1 | | 9/2011 | Hill et al. |
| 2011/0237722 A1 | | 9/2011 | Hill et al. |
| 2011/0245386 A1 | | 10/2011 | Hill et al. |
| 2011/0251312 A1 | | 10/2011 | Hill et al. |
| 2011/0281983 A1 | | 11/2011 | Hill et al. |
| 2012/0010312 A1 | | 1/2012 | Balbo Block et al. |
| 2016/0083500 A1 | | 3/2016 | Balbo Block et al. |
| 2016/0137676 A1 | * | 5/2016 | Rhudy .................. C09K 21/12 521/165 |

FOREIGN PATENT DOCUMENTS

| | | |
|---|---|---|
| GB | 2000535 A | 1/1979 |
| WO | 2010051884 A1 | 3/2010 |
| WO | 2014170316 A1 | 10/2014 |
| WO | 2017083463 A1 | 5/2017 |
| WO | 2017083468 A1 | 5/2017 |
| WO | 2017083471 A1 | 5/2017 |

OTHER PUBLICATIONS

U.S. Appl. No. 16/041,893, filed Jul. 23, 2018, claims provided.
PCT Patent Application No. PCT/US18/43228, filed Jul. 23, 2018, claims provided.
PCT Patent Application No. PCT/US18/43219, filed Jul. 23, 2018, claims provided.
PCT Patent Application No. PCT/US18/43218, filed Jul. 23, 2018, claims provided.
International Search Report and Written Opinion from PCT/US2018/043219 dated Oct. 19, 2018.
International Search Report and Written Opinion from PCT/US2018/043288 dated Oct. 19, 2018.

* cited by examiner

REACTIVE FLAME RETARDANT BLENDS FOR FLEXIBLE POLYURETHANE FOAM

This application claims the benefit of U.S. provisional patent application Ser. No. 62/561,365, filed Sep. 21, 2017, the entire contents of which are incorporated by reference herein.

FIELD OF THE INVENTION

The disclosure herein provides for the use of reactive dialkyl phosphorus-containing compounds, namely hydroxyl-functional esters of dialkyl phosphinic acids, which when reacted with polyol and isocyanate, serve as highly efficient reactive flame retardants in flexible polyurethane foams. The invention further provides fire-retarded flexible polyurethane foam with said hydroxyl-functional dialkyl phosphinates reacted and incorporated into the polymer matrix of a flexible polyurethane foam. The expressions "fire retardants" and "flame retardants" are used herein interchangeably.

BACKGROUND OF THE INVENTION

Brominated or phosphorus-based flame retardants are known to be highly effective and, in many cases, are the only options for reducing the fire risk of synthetic materials such as flexible polyurethane foams. However, the growing public and governmental scrutiny of chemicals, and in particular flame retardants, has increased over the years. The goal is towards more sustainable, reactive, polymeric and/or halogen-free new products. Scrutiny greatly diminishes if a flame retardant is reacted into the polymer matrix and cannot be leached-out.

Thus, there is a demand for reactive phosphorus-containing fire retardants for flexible polyurethane possessing such features as high phosphorus content, clear light color and good compatibility with polyether polyols and polyester polyols employed in the polyurethane industry.

SUMMARY OF THE INVENTION

The present invention provides a flame retardant blend comprising (1) reactive dialkyl phosphorus-containing mono-hydroxyl-functional compound and (2) a phosphate compound, said flame-retardant blend possessing highly satisfactory flame-retarding characteristics and having good compatibility with the polyol components of a flexible polyurethane foam-forming system. The expression "a flexible polyurethane foam-forming system" as used herein shall be understood to comprise a polyol, an isocyanate and the flame retardant blend(s) as described herein. The mono-hydroxyl-functional dialkyl phosphinate compounds are fully reactive through their single hydroxyl-functional group, and can be more easily formulated than di- or tri-hydroxyl-functional dialkyl phosphinate compounds. It has been surprisingly found that despite its lower content of hydroxyl-functionality, the reactive mono-hydroxyl functional dialkyl phosphinate compounds herein can be reacted and incorporated into the polymer structure of a flexible polyurethane foam, e.g., by reaction with the isocyanate component of the flexible polyurethane foam-forming system, without disrupting the elastic properties of the flexible polyurethane foam. This means that the flame retardants of the invention become integrated into the flexible foam substrate, such that they are not released into the environment and are not likely to penetrate through cell membranes of living tissue, and therefore do not pose a health hazard. The invention further provides the flexible polyurethane foam-forming system described above, including but not limited to the reactive dialkyl phosphorus-containing mono-hydroxyl-functional compounds described herein.

The applicants herein have discovered an unexpected synergistic relationship between the mono-hydroxyl-functional dialkyl phosphinate compounds described herein and phosphate compounds, such as phosphate esters. These phosphinate/phosphate ester blends contain less phosphorus than just a mono-hydroxyl-functional dialkyl phosphinate compound alone but still retain the same flame retardant efficiency. Further applicants have discovered that this synergistic property extends to a variety of phosphate ester products which can be combined with mono-hydroxyl-functional dialkyl phosphinate.

In addition to holding the flammability performance at a high level with these synergistic flame retardant blends, applicants have also discovered the unexpected improvement in physical properties of the resulting foams (e.g., compression set) which are greatly improved over what is observed using the mono-hydroxyl-functional dialkyl phosphinate compounds alone. Reactive flame retardant products are known in the art to disrupt the normal foam-forming process, resulting in poor foam physical properties. In most cases this is observed by a loss of the foam's ability to recover after compression at an elevated temperature. Compression set testing according to ASTM D3574 is a common foam requirement, and ensures compressed foam will indeed rebound. By using a small amount of the mono-hydroxyl-functional dialkyl phosphinate compounds in the phosphinate/phosphate ester flame retardant blends, the negative effects of using a reactive flame retardant product can be avoided while at the same time still retaining the high flame retardant efficiency required in the end use application. The flame retardant blends surprisingly retain both excellent FR performance and also good physical properties.

The term "foam" as used herein refers to flexible polyurethane foams. The flexible polyurethane foam described herein, or claimed herein, as comprising, consisting essentially of, or consisting of the reacted mono-hydroxyl-functional dialkyl phosphinate compounds of the general formula (I-A) and/or (I-B), the phosphate compound, and a group of phosphorus-containing diol and/or polyol reaction products of the partial phosphorylation of polyalcohols, which contains at least one phosphorus-containing group of the general formula (I-B) are all understood herein to contain the aforementioned formula(e) as reactive materials, i.e., the aforementioned formula(e) are reacted into the flexible polyurethane material's structure, in which case the aforementioned formula(e) may not be present, or would not be present in the same structural formula(e) as described herein, but would be present in the flexible polyurethane material as a reaction product of a diol and/or polyol, an isocyanate and the structural formula(e) described herein.

The term "polyol" as used herein will be understood as also possibly being defined as a diol and/or a polyol.

The flame retardant blend of the present invention provides a flame-retardant effective amount of (A) mono-hydroxyl-functional dialkyl phosphinate compounds of the general formula (I-A) and (I-B), and a group of phosphorus-containing diol and/or polyol reaction products of the partial phosphorylation of polyalcohols, which contains at least one phosphorus-containing group of the general formula (I-B), and (B) phosphate compound, wherein formula (I-A) is:

(I-A)

wherein:

$R^1$ and $R^2$, are selected from a linear or branched alkyl group containing from 1 to 4 carbon atoms, such as methyl, ethyl, propyl, isopropyl, butyl, and isobutyl, preferably methyl or ethyl, more preferably both $R^1$ and $R^2$ being ethyl; and, X is either and when X is $-(Z)_k-R^3$, Z is $-(Y-O)_n-$, wherein Y is a linear or branched alkylene group containing from 2 to 8 carbon atoms, preferably from 2 to 4 carbon atoms, more preferably ethylene, propylene, or isopropylene, and n represents an integer from 1 to 20, preferably from 1 to 5, and even more preferably from 1 to 2.

k may be 0 or 1;

$R^3$ is selected from hydrogen, a mono-hydroxy-terminated linear or branched alkylene group containing from 2 to about 8 carbon atoms, preferably from 2 to 4 carbon atoms; and, provided that when k is zero, $R^3$ is the mono-hydroxy-terminated linear or branched alkylene group and when k is 1, $R^3$ is hydrogen, and when X is $R^4$ and $R^5$ are each independently selected from H, a linear or branched alkyl group containing from 1 to 8 carbon atoms, preferably from 1 to about 4 carbon atoms, and most preferably any one of methyl, ethyl or propyl, a linear or branched alkenyl group containing from 2 to 8 carbon atoms, preferably from 2 to about 4 carbon atoms, a halo-substituted alkyl group containing from 1 to 8 carbon atoms, an alkoxy group containing from 1 to 8 carbon atoms, preferably from 1 to about 4 carbon atoms, an aryl group containing from 6 to 12 carbon atoms, preferably from 6 to about 8 carbon atoms, and an alkylaryl group containing from 7 to 16 carbon atoms, preferably from 7 to about 12 carbon atoms, or $R^4$ and $R^5$ are bonded to each other to form a cycloalkyl group containing from 4 to about 8 carbon atoms, preferably 6 carbon atoms; and wherein formula (I-B) is:

(I-B)

wherein:

$R^1$ and $R^2$, are independently selected from a linear or branched alkyl group containing from 1 to 4 carbon atoms, such as from methyl, ethyl, propyl, isopropyl, butyl, and isobutyl, preferably methyl or ethyl, more preferably both $R^1$ and $R^2$ both being ethyl; and, $n^1$ is an integer equal to or greater than 1, and $n^2$ is one, preferably $n^1$ is from about 1 to about 5 and $Z^2$ is a moiety derived from a diol or polyol which has a valence of $n^1+n^2$, and is of the general formula:

wherein R is selected from the group consisting of:

and where each $R^6$ independently is H or is an alkyl of from 1 to 4 carbon atoms, x is 0 or $\geq 1$, preferably 1 to 4, more preferably x=1, y is 2 or 3; z is an integer of from 2 to 5; and, $m \geq 1$, preferably m=1.

There is also provided herein a process for the preparation of these compounds.

The compounds of formula (I-A) can be prepared by the reaction of mono-hydroxyl-functional-dialkyl phosphinic acids of formula (II) with compounds having an oxirane group, wherein formula (II) is:

(II)

wherein $R^1$ and $R^2$ are as defined.

The compounds of formula (I-A) can also be prepared by the reaction of dialkyl phosphinic halides of formula (III) with aliphatic diols, wherein formula (III) is:

(III)

and wherein $R^1$ and $R^2$, are as defined, and A is chlorine or bromine.

The phosphorus-containing diols and/or polyols of the invention, for example those of formula I-B, can be prepared by the reaction of dialkyl phosphinic halides of formula (III) with aliphatic diols and/or polyols.

The reactive mono-hydroxyl-functional dialkyl phosphinates of this invention possess high phosphorus content, have good hydrolytic and thermal stability, exhibit good compatibility with the diol and/or polyol components of the flexible polyurethane foam-forming system, and are useful as highly efficient reactive flame retardants in flexible polyurethane foams.

The present invention further provides fire-retarded flexible polyurethane comprising the reactive residue of said phosphorus-containing mono-hydroxyl-functional compounds and phosphate compound after being reacted in the flexible polyurethane foam-forming system to form the flexible polyurethane foam. The phosphorus-containing mono-hydroxyl-functional compounds herein can be used in the flexible polyurethane foam-forming system either individually or in an admixture with one another, and/or with other flame retardants, including halogen-containing flame retardants and phosphorus-containing flame retardants.

All the above and other characteristics and advantages of the invention will be better understood through the following illustrative and non-limitative detailed description of the preferred embodiments thereof.

DETAILED DESCRIPTION OF PREFERRED EMBODIMENTS

In one embodiment the mono-hydroxyl-functional dialkyl phosphinates of formula (I-A) can be those of the more specific formulae (I-A-1) or (I-A-2), wherein formula (I-A-1) is:

(I-A-1)

wherein $R^1$ and $R^2$, Z, k, and $R^3$ are as defined above; and, wherein formula (I-A-2) is:

(I-A-2)

and wherein $R^1$, $R^2$, $R^4$ and $R^5$ are as defined above.

In one embodiment herein, the mono-hydroxyl-functional dialkyl phosphinates of formula (I-A) of the present invention are prepared by the reaction of dialkyl phosphinic acids of formula (II) with compounds of formula (IV), having oxirane groups, which formula (IV) is Formula (IV)

wherein:
$R^4$ and $R^5$ are as defined above.

In one other embodiment herein, the mono-hydroxyl-functional dialkyl phosphinates of formula (I-A) of the present invention are prepared by the reaction of dialkyl phosphinic halides of formula (III) with aliphatic diols of formula (V):

HO—(Z)$_k$—$R^3$ (V)

wherein Z, $R^3$ and the subscript k are as defined above.

The phosphorus-containing diols and/or polyols of the present invention, for example those of formula (I-B), are prepared by the reaction of dialkyl phosphinic halides of formula (III) with aliphatic diols or polyols.

The dialkyl phosphinic acids (II) and dialkyl phosphinic halides (III) employed as starting materials in the process of the present invention are for the most part well known in the art. The compounds of formula (II) can be obtained for example by hydrolysis of the corresponding dialkyl phosphinic halides (III). The latter can be prepared for example by the method described in U.S. Pat. No. 3,104,259, the entire contents of which are incorporated by reference herein.

Specific oxirane compounds used in the process for preparing the compounds of formula (I-A) or more specifically (I-A-1) or (I-A-2) of the present invention are selected from the group consisting of, but not limited to, for example, ethylene oxide, propylene oxide, 1,2-epoxybutane, 1,2-epoxypentane, 1,2-epoxyhexane, 1,2-epoxy-5-hexene, 1,2-epoxy-2-methylpropane, 1,2-epoxyoctane, glycidyl methyl ether, glycidyl isopropyl ether, glycidyl isobutyl ether, glycidyl heptyl ether, glycidyl 2-ethylhexyl ether, glycidyl allyl ether, trimethylolpropane triglycidyl ether, styrene oxide, cyclohexene oxide, epichlorohydrin and combinations thereof. More preferably, ethylene oxide, propylene oxide and 1,2-epoxybutane are used as the oxirane compound.

Specific aliphatic diols used in the process for preparing the compounds of formula (I-A) or more specifically (I-A-1) or (I-A-2) of the present invention are selected from the group consisting of, but not limited to, for example, ethylene glycol, diethylene glycol, triethylene glycol, propylene glycol, dipropylene glycol, tripropylene glycol, 1,3-propane diol, 1,4-butane diol, 2-butene-1,4-diol, 1,5-pentane diol, 1,6-hexane diol, 1,8-octane diol, and other diols having molecular weights up to 700.

The aliphatic diols and/or polyols used in the process for preparing the phosphorus-containing polyols of the invention can generally be any suitable diols and/or polyols having at least two or at least three reactive hydrogen atoms, respectively, examples being those having functionality of from 2 or 3 to 6, preferably, 2, 3 and 4, and preferably a molecular weight of from about 100 to about 700. Specific aliphatic diols and/or polyols can be selected from the group of non-polymeric polyalcohols, for example, trimethylol propane, trimethylol ethane or glycerol.

Preferably, the diols and/or polyols to be used according to the present invention are polyether diols and/or polyols. This class of diols and/or polyols is obtained by the ring-opening addition reaction of one or more alkylene oxides (e.g., ethylene oxide and propylene oxide) with a suitable reactant containing one or more active hydrogen atoms, such as alcohols, amine and acids; more specifically, said reactant may be selected from a group consisting of diols, triols, novolac resins, pentaerythritol, sorbitol, sucrose, diethylenetriamine and the like. Polyester-polyols may also be used according to the present invention; this class of polyols is obtained by the condensation reaction of carboxylic, dicarboxylic (or polycarboxylic) acid, such as adipic acid, phthalic acid or the like, with diols or triols. The aliphatic diols and/or polyols used in the process for preparing the phosphorus-containing mono-ols, diols or polyols of the present invention are selected from polymeric diols and/or polyols such as polyether polyols, polyester polyols, and mixtures thereof.

In a preferred embodiment of the present invention, the reaction of dialkyl phosphinic acids (II) with an oxirane compound is carried out in a medium of excess oxirane, with or without an organic solvent such as tetrahydrofuran, 1,4-dioxane, or toluene.

The amount of oxirane compound used in the reaction with mono-hydroxy dialkyl phosphinic acids (II) is a 5-300% molar excess relative to the mono-hydroxy dialkyl phosphinic acid, and preferably a 50-100% molar excess. Using a molar excess of the oxirane compound greater than 100% relative to the mono-hydroxy dialkyl phosphinic acid is inexpedient due to the need to recycle a large quantity of oxirane.

The mono-hydroxyl-functional dialkyl phosphinates of formula (I-A) or more specifically (I-A-1) or (I-A-2) of the present invention have a phosphorus content of about 8-18% by weight and a hydroxyl number of about 150-315 mg KOH/g, depending on the dialkyl phosphinic acid and the oxirane taken for the reaction.

It is preferred, for the preparation of the target mono-hydroxyl-functional dialkyl phosphinates (I-A) or more specifically (I-A-1) or (I-A-2) with the highest possible phosphorus content, to react mono-hydroxy-dialkyl phosphinic acids having the highest phosphorus content amongst the mono-hydroxy dialkyl phosphinic acids (II), with ethylene oxide and propylene oxide.

Thus, the compounds of formula (I-A) or more specifically (I-A-1) or (I-A-2), having particularly valuable properties are those wherein $R^1$, and $R^2$ are each ethyl.

Said reactions are carried out at a temperature of between 40° C. and 120° C., and preferably between 70° C. and 90° C. At a temperature lower than 40° C. the reaction becomes unacceptably slow. On the other hand, applying a temperature higher than 120° C. is not advisable since at such temperatures undesirable decomposition products may be formed.

In a preferred embodiment, the reaction of dialkyl phosphinic halides (III) with an aliphatic diol is carried out in a medium of excess diol.

The amount of diol compound used in the reaction with dialkyl phosphinic halides (III) is generally 2 to 10 moles per 1 mole dialkyl phosphinic halide, and preferably a 4 to 8 moles molar excess. The relatively large excessive amounts of these diols are required for minimizing the formation of undesirable bis(dialkyl phosphinate) esters of glycols and diols having no hydroxyl groups. Using a molar excess of the diol compound greater than 10 moles per 1 mole dialkyl phosphinic halide is inexpedient due to the need to recycle a large quantity of diol.

The mono-hydroxyl-functional dialkyl phosphinates of formula (I-A) or more specifically (I-A-1) or (I-A-2) of the present invention have a phosphorus content of about 2-18% by weight and a hydroxyl number of about 150-450 mg KOH/g, depending on the dialkyl phosphinic halide and the diol taken for the reaction.

It is preferred, for the preparation of the target mono-hydroxyl-functional dialkyl phosphinates (I-A) or more specifically (I-A-1) or (I-A-2) with the highest possible phosphorus content, to react dialkyl phosphinic halides having the highest phosphorus content amongst the dialkyl phosphinic halides (III), with ethylene glycol.

Thus, the compound of formula (I-A-1) having particularly valuable properties, is that wherein $R^1$ and $R^2$ are each ethyl, k is 1, n is 1, Y is —$CH_2CH_2$—, and $R^3$ is hydrogen.

Said reactions are carried out at a temperature of between 25° C. and 120° C., and preferably between 50° C. and 90° C. Applying a temperature lower than 25° C. results in a low yield. On the other hand, applying a temperature higher than 120° C. is not advisable since at such temperatures undesirable decomposition products may be formed. In addition, a catalyst can be used to accelerate reaction for example $MgCl_2$ or $ZnCl_2$.

In a preferred embodiment the reaction of dialkyl phosphinic halides (III) with an aliphatic diol is carried out in the presence of a strong base such as sodium hydroxide or potassium hydroxide, in a medium of both an organic solvent and an excess aliphatic alcohol. The organic solvent is selected from aromatic compounds. Especially suitable aromatic solvents are chlorobenzene, ortho-dichlorobenzene, mesitylene, and in particular, toluene and xylene. An effective amount of the base employed in the process is in a range of 1-1.2 mol per 1 mol dialkyl phosphinic halides (III), and preferably 1-1.05 mol.

Sodium or potassium hydroxide can be employed in a solid form. Water resulting from the reaction between the diol and the base should be eliminated from the reaction mixture as much as possible prior to the addition of dialkyl phosphinic halides (III).

In a preferred embodiment, the reaction of dialkyl phosphinic halides (III) with an aliphatic diol and/or polyol is carried out by varying the degree of partial phosphorylation of the diol and/or polyol. The phosphorus-containing diol and/or polyol according to the present invention comprises at least one phosphorus-containing group. This phosphorus-containing group is a group of formula (III-A).

(III-A)

wherein:
wherein $R^1$ and $R^2$ are as defined, and wherein the wavy line indicates a bond to a diol or polyol via an oxygen atom.

The phosphorus-containing diol and/or polyol of the invention can also comprise two or more phosphorus-containing groups of formula (III-A), wherein these phosphorus-containing groups can be identical or different.

The reaction of dialkyl phosphinic halides (III) with an aliphatic diol and/or polyol can be carried out in the presence of an organic base which is selected from, but not limited to, the group of tertiary amines, for example, triethylamine, pyridine, diisopropyl ethyl amine, 1-methylimidazole. The amount of base used is equimolar to dialkyl phosphinic halide (III). The base can also be used in excess to the dialkyl phosphinic halide. Said reactions are typically carried out in a medium of inert organic solvent. Suitable solvents for the phosphorylation are, but not limited to, halogenated hydrocarbons, such as methylene chloride, chloroform or 1,2-dichloroethane. Solvents which are further suitable are ethers such as dioxane or tetrahydrofuran. Solvents which are further suitable are hydrocarbons such as hexane or toluene.

In a preferred embodiment the reaction of dialkyl phosphinic halides (III) with an aliphatic diol and/or polyol is carried out in the presence of a strong inorganic base such as sodium hydroxide or potassium hydroxide, in a medium of an organic solvent such as chlorobenzene, mesitylene, and in particular, toluene and xylene.

An effective amount of the base employed in the process is in a range of 1-1.2 mol per 1 mol dialkyl phosphinic halides (III), and preferably 1-1.05 mol. Sodium or potassium hydroxide can be employed in a solid form. Water resulting from the reaction between the diol, and/or polyol and the base should be eliminated from the reaction mixture as much as possible prior to the addition of dialkyl phosphinic halides (III).

The amounts of dialkyl phosphinic halide (III) and diol and/or polyol can be adjusted so that the desired degree of functionalization is attained. Partial phosphorylation of the diol and/or polyol can be achieved by using less than the stoichiometric amount of the dialkyl phosphinic halide (III) to the diol and/or polyol based on its functionality. In this way, only a portion of the OH groups in the diol and/or polyol is reacted with dialkyl phosphinic halide.

The phosphorus-containing diol and/or polyol of the present invention (also described herein as the partially phosphorylated diol and/or polyol) has a remaining average OH-functionality (following phosphorylation thereof) of 1 and a molecular weight of from about 200 to about 1000. The phosphorus-containing diols and/or polyols of the present invention have a phosphorus content of about 4-20% by weight and a hydroxyl number of about 20-800 mg KOH/g, depending on the dialkyl phosphinic halide and the diol and/or polyol taken for the reaction, and on the molar ratio between them.

The diol and/or polyol phosphorylation reactions are carried out at a temperature of between 0° C. and 100° C., and preferably between 10° C. and 90° C. Applying a temperature lower than 0° C. results in a low reaction rate. On the other hand, applying a temperature higher than 100° C. is not advisable since at such temperatures undesirable decomposition products may be formed.

The mono-hydroxyl-functional dialkyl phosphinate compounds of the invention are useful as reactive flame retardants. The flame retardants may be used in a blend with phosphate compound as described herein, and also optionally with additional halogenated or non-halogenated products. Some examples of halogenated flame retardants which can be used as the phosphate compound or in addition to the phosphate compound described herein (where the two are understood to be different) are the chlorinated phosphates such as the non-limiting examples of tris(1,3-dichloro-2-propyl) phosphate (TDCP) and chlorinated bisphosphates like CR-504L [phosphoric acid esters, oxydi-2,1-ethanediyl tetrakis (2-chloro-1-methylethyl) ester] (CAS #s 52186-00-2 & 184530-92-5) available from Daihachi, Amgard V6, and Yoke's ELF-800 (propylene oxide analogue of Amgard V6). For flexible polyurethane foams it is preferred to use halogen-free hydroxyl-functional dialkyl phosphinates of the invention with halogen-free phosphate compounds.

The phosphate component herein (phosphate compound) can be any phosphate wherein the phosphate is selected from the group consisting of aliphatic phosphates, aromatic phosphates, mixed aromatic aliphatic phosphates, aliphatic bisphosphates, aromatic bisphosphates, mixed aliphatic aromatic bisphosphates, oligomeric phosphates, polymeric phosphates and combinations thereof. In one embodiment, the aliphatic moieties can be any of alkyl, alkenyl and alkynyl of up to 20 carbon atoms, preferably up to 12 carbon atoms and most preferably up to 8 carbon atoms. In another embodiment, the aryl moieties can contain from 6 to 20 carbon atoms, from 6 to 12 carbon atoms and from 6 to 8 carbon atoms.

In one non-limiting embodiment, the phosphate is of the general formula (VI):

where $R^7$, $R^8$ and $R^9$ are each independently phenyl, alkyl substituted phenyl, or linear or branched, or saturated or unsaturated alkyl containing up to 22 carbon atoms, more specifically linear or branched, or saturated or unsaturated alkyl containing from up to 6 carbon atoms, or phenyl, or alkyl substituted phenyl of from 6 to about 22 carbon atoms, even more specifically from 6 to 12 carbon atoms, or linear or branched alkoxy containing up to 8 carbon atoms, preferably up to 6 carbon atoms, R is a divalent alkylene group of from 1 to 3 carbon atoms, and the subscripts a, b and c are each 0 or 1, and when any of a, b, and c are 1, then the respective $R^7$, $R^8$ and $R^9$ bonded thereto is a linear or branched alkoxy containing up to 8 carbon atoms, preferably up to 4 carbon atoms.

Some suitable examples of trialkyl phosphates are triethyl phosphate, tripropyl phosphate, triisopropyl phosphate, tributyl phosphate, tri-tert-butyl phosphate, tris(2-ethylhexyl) phosphate, trioctyl phosphate, and combinations thereof.

Some examples of alkoxy phosphates are tris(2-butoxyethyl) phosphate, tris(2-methoxyethyl) phosphate, tris(2-ethoxyethyl) phosphate, tris(2-i-propoxyethyl) phosphate, tris(2-hexoxyethyl) phosphate and combinations thereof.

In another embodiment herein, the phosphate is of the general formula (VII)

where either (i) only one of $R^8$ and $R^9$ is a linear or branched or saturated or unsaturated alkyl containing up to 22 carbon atoms, more specifically from 6 to 22 carbon atoms and most specifically from 4 to 12 carbon atoms, and the other remaining $R^8$ or $R^9$ moiety is an unsubstituted or 1-4 carbon atoms substituted aryl group of from 6 to 10 carbon atoms, or (ii) both of $R^8$ and $R^9$ are each a linear or branched or saturated or unsaturated alkyl containing up to 22 carbon atoms, more specifically from 6 to 22 carbon atoms and most specifically from 4 to 12 carbon atoms.

In one embodiment herein the phosphate herein can be selected from the group consisting of diethyl phenyl phosphate, ethyl diphenyl phosphate, di-n-propyl phenyl phosphate, n-propyl diphenyl phosphate, di-n-butyl phenyl phosphate, n-butyl diphenyl phosphate, di-isobutyl phenyl phosphate, isobutyl diphenyl phosphate, di-n-pentyl phenyl phosphate, n-pentyl diphenyl phosphate, di-n-hexyl phenyl phosphate, n-hexyl diphenyl phosphate, 2-ethylhexyl diphenyl phosphate, isodecyl diphenyl phosphate, and mixtures thereof.

In one specific embodiment herein, the phosphate is an aromatic phosphate compound, preferably an aromatic phosphate ester containing three aryl moieties, or a bisphosphate containing four aryl moieties.

Examples of commercial phosphate esters useful herein are triaryl phosphate esters such as those selected from the group consisting of triphenyl phosphate, tricresyl phosphate, mixed phenyl cresyl phosphates, trixylyl phosphate, mixed phenyl xylyl phosphates, trimesityl phosphate, mixed mesityl phenyl phosphates, tris(propylphenyl) phosphate, mixed propylphenyl phenyl phosphates, tris(isopropylphenyl) phosphate, mixed isopropylphenyl-phenyl phosphates, tris(butylphenyl) phosphate, mixed butylphenyl phenyl phosphates, tris(isobutylphenyl) phosphate, mixed isobutyl-phenyl phenyl phosphates, tris(t-butylphenyl) phosphate, mixed t-butylphenyl phenyl phosphates and combinations thereof.

In yet another embodiment herein, the phosphate is of the general formula (VIII):

(VIII)

wherein X is the residue of a $C_2$-$C_{30}$ dihydroxy compound, or a $C_6$-$C_{30}$-dihydroxy aryl compound, $R^{10}$, $R^{11}$, $R^{12}$ and $R^{13}$ are each independently a $C_1$-$C_8$-alkyl, $C_3$-$C_8$-cycloalkyl or $C_6$-$C_{20}$-aryl, and the subscript n is an average oligomeric value of from 1 to 10.

In the above formula of aromatic phosphate ester (VIII), the subscript n is preferably 1 to 3, and more preferably 1, X is a residue of an aromatic dihydroxy compound such as hydroquinone, resorcinol, bis(4-hydroxydiphenyl)methane, bisphenol A, dihydroxydiphenyl, dihydroxynapthalene, bis (4-hydroxyphenyl)sulfone, bis (4-hydroxyphenyl)ketone and bis(4-hydroxyphenyl)sulfide, and is preferably the residue of hydroquinone, resorcinol or bisphenol A, and $R^{10}$, $R^{11}$, $R^{12}$, $R^{13}$ are each independently the residue of an aromatic monohydroxy compound such as phenol, cresol, xylenol, isopropylphenol, butylphenol and p-cumylphenol, and preferably are each independently the residue of phenol, cresol or xylenol.

Further, as the phosphate component herein are the aromatic bisphosphate esters including those selected from the group consisting of hydroquinone bis(diphenyl phosphate), resorcinol bis(diphenyl phosphate) (Fyrolflex® RDP, ICL-IP America, Tarrytown, N.Y.), bisphenol A bis(diphenyl phosphate) (Fyrolflex® BDP, ICL-IP America, Tarrytown, N.Y.), neopentyl glycol bis(diphenyl phosphate), propylene glycol bis(diphenyl phosphate), and their combinations. Of these phosphate esters, resorcinol bis(diphenyl phosphate) and bisphenol A bis(diphenyl phosphate) and combinations thereof are most preferred.

The flame retardant blend(s) herein will contain from 25 to 95% by weight phosphate, specifically from 50% to 90% by weight of phosphate, more specifically from 70 to 90% by weight of phosphate, based on the total weight of the flame retardant blend.

The phosphate herein can be prepared by any one of several known and conventional processes, e.g., the aromatic phosphate can be prepared by the reaction of phosphorus oxychloride with an aromatic dihydroxy compound such as any of those aforementioned, in the presence of a Lewis acid catalyst, e.g., aluminum chloride, magnesium chloride or titanium tetrachloride, etc., removing unreacted phosphorus oxychloride from the resulting reaction mixture and thereafter reacting the latter with an aromatic monohydroxy compound such as any of those aforementioned to provide an aromatic phosphate ester. In a variation of this process, an aromatic phosphate ester is obtained by reacting phosphorus oxychloride with a mixture of aromatic monohydroxy compound and aromatic dihydroxy compound.

In one embodiment, the flame retardant blends as described herein are provided such that the hydroxyl-functional dialkyl phosphinate and phosphate component(s) are blended with reactive brominated products containing a hydroxyl-group. For flexible PU foams as described herein it is preferred to use pure halogen-free hydroxyl-functional dialkyl phosphinate(s) of the invention with phosphate compound.

The mono-hydroxyl-functional dialkyl phosphinate compounds of the present invention are highly efficient reactive flame retardants when incorporated into flexible polyurethane foams with phosphate compound. It should be noted that the flame retardant blend(s) of the invention are useful over a broad Isocyanate Index (abbreviated herein MDI or TDI). The index refers to the ratio of isocyanate practically used in the formulation vs. the theoretical stoichiometric amount of isocyanate required, expressed in percentages.

The flexible polyurethane foams herein contain a typical flame-retardant-effective amount of the flame retardant blend of this invention. Typically, the flame retardant blends of this invention are applied in amounts that provide a total phosphorus concentration in the polymer (i.e., the flexible polyurethane foam) in the range of 0.3 to 15 wt %, based on the total weight of the polymer. Preferably, the total phosphorus concentration in the polymer is in the range of 1 to 10 wt % and more preferably, in the range of 1.5 to 5 wt %, based on the total weight of the flexible polyurethane polymer. Most preferably, the amounts used of the flame retardant blend(s) of this invention are at least sufficient to meet the current requirements of the flammability Test Method MVSS 302.

By suitable choice of components and conditions, the flexible polyurethane foams are made which may vary in properties as to the degree of flexibility. Thus, flexible foams are generally made from polymeric diols or triols having hydroxyl numbers of from 20 to 80 using water as the principal foaming agent.

The flexible polyurethane foams of the present invention can contain the appropriate choice of auxiliary agents, for example catalysts, surfactants, foam stabilizers and the like.

Flexible polyurethane foams as used herein is made using a diol and/or polyol having a 3,000 to about 6,000 molecular weight diol and/or polyol as described herein, e.g., a polyether triol prepared by the addition of propylene oxide to glycerol. A flexible polyurethane foam as used herein is characterized by having a core impact resilience of at most 30% and a glass transition point of from −80° C. to −60° C. Here, the flexible polyurethane foam preferably has a hard segment content of at most 40 mass %. Conventional flexible polyurethane foam having a bulk foam density of 2.5 pounds per cubic foot (PCF) or lower and having a foam hardness or IFD (measured in accordance with test method ASTM 3574-Test B1) in a range of 10 to 90 lb/50 in$^2$.

The method of making the flexible polyurethane foam of the invention can comprise combining the diol and/or polyol component and/or the isocyanate component or catalyst and one or more of the flame retardant materials of Formulae (I-A), (I-A-1), (I-A-2) and (I-B) and phosphate compound(s) described herein which may be metered and pumped into a common mixing vessel, and then the resulting mixture may be easily be moved to the polymerization site for use in molds, slab stock operations, etc.

The reactive flame retardants and phosphate compound(s) of the invention herein may also be admixed with the diol and/or polyol reactant before combination with the isocyanate reactant. It is also within the scope of the invention to mix the reactive flame retardant materials and phosphate compound with the isocyanate before combining such mixture with the diol and/or polyol reactant. However, if the isocyanate and the aforementioned flame retardant materials are mixed and allowed to stand at room temperature for a substantial period of time, reaction may occur. The "reaction product" as used in the claims and specification herein, can in one embodiment comprise reacting the contents of the flexible polyurethane foam-forming system in any one of the aforementioned methods, and may further include reacting the reactive flame retardant via a pre-polymer technique, such as for example, reacting an excess of isocyanate with polyol to form an isocyanate terminated pre-polymer and then further reacting the prepolymer with the reactive flame retardant and phosphate compound herein.

The flame retardant materials of Formulae (I-A), (I-A-1), (I-A-2) and (I-B) described herein may be described as isocyanate-reactive (NCO-reactive) materials, i.e., they are reactive with the isocyanates through the hydroxyl group(s).

The diols and/or polyols used in making the flexible polyurethane foams described herein can include any organic polyol, including diols, polyols, and polyether, polyester, polyesteramide polyols having hydrogen atoms that are reactive with isocyanates may be used. Generally, these materials have molecular weights ranging from about 62 to about 5,000 and have from 2 to about 10 or more hydroxyl groups per molecule and weight percent hydroxyl contents ranging from about 0.5 to about 25%. The generally have hydroxyl numbers of from about 50 to as high as 500 or even 700.

In the polyester-polyol type of reactant the acid number should be less than 10 is usually as close to 0 as possible. These materials are referred to conveniently as the "polyol" reactant. The useful active hydrogen-containing diol and/or polyols include the large family of adduct compounds which result when ethylene oxide, propylene oxide, 1,2- and 2,3-butylene oxide, or other alkylene oxides are added to such active hydrogen compounds such as diols, glycols and polyols presented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines and the like. Various amounts of these alkylene oxides may be added to the base diol, polyol or amine molecules referred to, depending upon the intended use of the polyurethane.

For example, a diol and/or polyol for use in making flexible foams could be well represented by glycerine to which sufficient propylene oxide was added to give a final hydroxyl content of about 1.7%. Such a material would have a molecular weight of about 3,000 and have a molar ratio of glycerine to propylene oxide of about 1 glycerine to 50 propylene oxide.

This technique of controlling flexibility by selection of the diol and/or polyol molecule and the subsequent amount of alkylene oxide added is well known to those in the art.

In addition to the glycols and the like which can serve as the base polyol molecule for addition of the alkylene oxides and thus yield the "polyol" molecule for reaction with the isocyanate, one can use a starting molecule which contains primary and/or secondary amine groups which have hydrogen reactive toward alkylene oxides. Here also, the quantity of alkylene oxide added depends on the intended uses of the final polyurethane products. In the flexible polyurethane products herein alkylene oxide would be used to produce polyols with lower hydroxyl content, such as from about 0.1% to about 5% or 10%.

Representative amines which may serve as active-hydrogen containing molecules for reaction with epoxides are those having from 1 to about 6 or more amino nitrogens, examples of which are ethyl amine, ethylene diamine, diethylenetriamine, triethylenetetramine, tetrapropylenepentamine and other linear saturated aliphatic alkylene amines, the important requirement being at least two, and preferably more, say 3 to 8 or 10 active hydrogen sites to which the alkylene oxide may be added.

It is also well known to use the hydroxyl bearing molecules which have been prepared by esterification type reactions from polyfunctional acids or anhydrides and polyfunctional alcohols as the active hydrogen compounds used in preparing the polyurethane systems. These compounds are often called polyester polyols. Typical acids used in making these polyester polyols are maleic, phthalic, succinic, fumaric, tetrahydrophthalic, chlorendic, and tetrachlorophthalic acids. Typical diols and/or polyols are ethylene, propylene, butylene, diethylene, and dipropylene, glycols, and polyethylene, polypropylene, glycols and glycerine, trimethylol propane, hexanetriol, pentaerythritol, sorbitol and the like. Where available the above mentioned acids may be used in the anhydride form if desired.

In making the polyester-polyols, any of the various polyfunctional acids or anhydrides or mixtures thereof are caused to react with any of the diols, glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those skilled in the art.

In the art and technology of making flexible polyurethanes, it is also known to employ what is called prepolymer techniques. This is a technique wherein part of the reaction involved in making flexible polyurethane is carried out yielding a prepolymer of increased molecular weight and with either resultant end groups of hydroxyls or isocyanates depending on the stoichiometric used in making this prepolymer. This prepolymer is then used to prepare the final flexible polyurethane product by reacting it with either a isocyanate or polyol, depending on, as mentioned above, whether the terminal groups of the prepolymer are hydroxyls or isocyanates, respectively.

Broadly, any of the prior art polyesters, isocyanate-modified-polyester prepolymers, polyesteramides, isocyanatemodified-polyesteramides, alkylene glycols, isocyanate-modified alkylene glycols, polyoxyalkylene glycols, isocyanate-modified polyoxyalkylene glycols, etc., having free reactive hydrogens and especially hydroxyl groups may be employed for the production of the polyurethanes described herein.

Examples of isocyanates which can be used include those having two or more isocyanate groups which have heretofore been used for making flexible polyurethane foams. Examples of such isocyanate compounds include aromatic isocyanates, aliphatic isocyanates and alicyclic isocyanates, as well as mixtures of two or more of such isocyanates, and modified isocyanates obtained by the modification of such isocyanates. Specific examples of such isocyanates are toluene diisocyanate, diphenylmethane diisocyanate, polymethylene polyphenylene polyisocyanate (crude MDI), xylylene diisocyanate, isophorone diisocyanate and hexamethylene diisocyanate; and modified products of such isocyanates, such as carbodiimide-modified products, biuret-modified products, dimers and trimers. Prepolymers with terminal isocyanate groups obtained from such isocyanates and active hydrogen-containing compounds can also be used.

In one embodiment, the isocyanate index range for flexible polyurethane foams can be from about 130 to about 80, more preferably, from about 120 to about 90 and most preferably from about 115 to about 95.

As the blowing agent in the flexible polyurethane foam-forming composition of the present invention, known blowing agents heretofore used in such compositions are suitably selected according to the properties required of the foamed product.

In the present invention, a cross-linking agent is also used as the case requires.

As the cross-linking agent, a compound having at least two functional groups having active hydrogen, such as hydroxyl groups, primary amino groups or secondary amino groups is preferred. However, in a case where a polyol compound is used as the cross-linking agent, the following is taken into account. Namely, a polyol compound having a hydroxyl value of at least 50 mg KOH/g and more than four functional groups, is considered to be the cross-linking agent, and a polyol which does not satisfy this, is considered to be any one of polyols of the above-mentioned polyol mixture (polyol (1), (2) or other polyol). Further, two or more cross-linking agents may be used together. As specific examples, a polyhydric alcohol such as dextrose, sorbitol or sucrose; a polyol having an alkylene oxide added to a polyhydric alcohol; an amine compound such as monoethanolamine, diethanolamine, ethylenediamine, 3,5-diethyl-2,4 (or 2,6)-diaminotoluene (DETDA), 2-chloro-p-phenylenediamine (CPA), 3,5-bis(methylthio)-2,4 (or 2,6)-diaminotoluene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane or isophoronediamine; and a compound obtained by adding an alkylene oxide thereto, may, for example, be mentioned.

When the above cross-linking agent is used, even in a case where, for example, a large amount of a blowing agent is used to produce a flexible foam having a low density, the foaming stability will be good, and it will be possible to produce such a flexible foam. Especially when a diol and/or polyol having a high-molecular weight is used, it is possible to produce a flexible foam having a low density which used to be considered difficult to foam. Further, when the cross-linking agent is used, the durability will be improved, as compared with a case where it is not used. In a case where a diol and/or polyol having a high-molecular weight is used as in the present invention, the foaming stability can readily be improved particularly when a compound having a relatively high-molecular weight, such as a molecular weight of at least 4000, is used.

Water is a typical example of such a blowing agent; other examples include methylene chloride, n-butane, isobutane, n-pentane, iso-pentane, dimethyl ether, acetone, carbon dioxide, and the like. Depending on the desired density and other properties of the foamed polyurethane, these and other blowing agents can be used alone or in combinations of two or more in a manner known in the art.

The amount of blowing agent to be used is not particularly limited but will ordinarily range from 0.1 to 20 parts by weight per 100 parts by weight of the diol and/or polyol component of the foam-forming composition. Preferably, the amount of blowing agent(s) will be such as to provide a foam density of from 0.8 to 2.5 pounds per cubic foot, and preferably from 0.9 to 2.0 pounds per cubic foot.

The polyurethane foam-forming composition herein can preferably contain any of the catalysts, and combination of catalysts, heretofore known or used for the production of polyurethane foams. Examples of useful catalysts include sodium hydroxide, sodium acetate, tertiary amines or materials which generate tertiary amines such as trimethylamine, triethylene diamine, N-methyl morpholine, N,N-dimethyl cyclohexylamine, and N,N-dimethyl aminoethanol. Also applicable are metal compounds such as hydrocarbon tin alkyl carboxylates, dibutyl tin diacetate, dibutyl tin dioctoate dibutyl tin dilaurate and stannous octoate; as well as other compounds intended to promote trimerization of the isocyanate such as, 2,4,6-tris(N,N-dimethylamino-methyl)phenol, 1,3,5-tris(N,N-dimethyl-3-aminopropyl)-S-hexahydrotriazine, potassium octoate, potassium acetate and catalysts such as DABCO TMR® and POLYCAT 43®.

Many other kinds of catalysts can be substituted for those listed above, if desired. The amount of catalyst used can advantageously range from 0.05 to 5 weight percent or more based on the total weight of diol and/or polyol in the foam-forming mixture.

The isocyanate (NCO) index which is applied in making the flexible foam according to the present invention is 95-125 and preferably 100-120. It is commonly understood that the NCO index of polyurethane foams is from about 80-130.

The densities of the flexible polyurethane foams herein may range of from 14-80 and preferably 16-55 and most preferably 20-40 kg/m$^3$.

Surfactants, including organic surfactants and silicone-based surfactants, may be added to serve as cell stabilizers. Some representative materials are sold under the designations SF-1109, L-520, L-521 and DC-193, which are, generally, polysiloxane polyoxylalkylene block copolymers. Also included are organic surfactants containing polyoxyethylene-polyoxybutylene block copolymers. It is particularly desirable to employ a minor amount of a surfactant to stabilize the foaming reaction mixture until it cures. Other surfactants that may be useful herein are polyethylene glycol ethers of long-chain alcohols, tertiary amine or alkanolamine salts of long-chain allyl acid sulfate esters, alkylsulfonic esters, alkyl arylsulfonic acids, and combinations thereof. Such surfactants are employed in amounts sufficient to stabilize the foaming reaction against collapse and the formation of large uneven cells. Typically, a surfactant total amount from about 0.2 to about 3 wt %, based on the formulation as a whole, is sufficient for this purpose.

However, it may be in some embodiments desirable to include some surfactants, e.g., DABCO DC-5598, available from Air Products and Chemicals, Inc., in a higher amount. In view of this a surfactant may be included in the inventive formulations in any amount ranging from 0 to 6 wt. %, based on the diol and/or polyol component.

Finally, other additives such as fillers and pigments may be included in the polyurethane foam-forming formulations described herein. Such may include, in non-limiting embodiments, barium sulfate, calcium carbonate, graphite, carbon black, titanium dioxide, iron oxide, microspheres, alumina trihydrate, wollastonite, prepared glass fibers (dropped or continuous), polyester fibers, other polymeric fibers, combinations thereof, and the like. Those skilled in the art will be aware without further instruction as to typical and suitable means and methods to adapt the inventive formulations to produce flexible polyurethane foams that, though still falling within the scope of the claims appended hereto, exhibit or benefit from desired property and/or processing modifications.

The flexible polyurethane foams described herein, be they be can be utilized in the construction and formation of various articles such as furniture, bedding, and automotive seat cushions, more specifically, furniture applications, automotive applications, boating applications, bus seating applications, train seating applications, RV seating applications, office furniture seating applications, aviation applications, tractor applications, bicycle applications, engine mount applications, compressor applications, bedding applications, insulation applications, sporting goods applications, shoe applications, carpet cushioning applications, packaging applications, textile applications, buffer cushioning applications, HVAC applications, tent applications, life raft applications, luggage applications, and hand bag applications.

Flexible slabstock polyurethane foam can be used for furniture, e.g., upholstered furniture, such as cushions, backs and arms, the automotive industry, such as seat and back cushions, and head linings and head rests, for automobiles and trucks, for public transport seating, such as busses and airplanes, as well as in any of tractor, bicycle and motorcycle seats including, but not limited to vehicle seat bottom and back bolsters, and armrests, as well as support rings for run flat tires, and other automobile interior components; bedding such as mattresses, as sound insulation materials, automobile interior components such as an arm rest, a steering wheel and a shift lever knob, shoe soles, and sporting goods.

The following examples illustrate specific embodiments of both the preparation of certain compounds of the invention and the utility of these compounds as reactive flame retardants in flexible polyurethane foams.

EXAMPLES

Preparation Example 1

Mixture of isomers

A 2-liter, jacketed, hastelloy reactor equipped with a mechanical stirrer, oil heater and positive displacement laboratory pump was charged with diethyl phosphinic acid (779 g, 6.38 mol) and sealed. The reactor was heated to an internal temperature of 45° C. Propylene oxide (743 g, 12.77 mol) was added to the reactor via the pump over two hours with the temperature being maintained below 65° C. Subsequently the reactor internal temperature was increased to 90° C. and maintained there for three hours. The excess propylene oxide was evaporated and the residue was distilled under vacuum (300-500 mTorr) using a wiped film evaporator at a jacket temperature of 125° C. The target fraction was collected as a clear, colorless liquid. The yield was 90% with respect to the starting diethyl phosphinic acid. The product was a mixture of two isomers of hydroxyl-functional esters of diethyl phosphinic acid, $^{31}$P NMR (acetic acid-d$_4$, ppm): 66.8-67.7; and had an acid # of 0.4 mg KOH/g and a phosphorus content of 15.9%.

Preparation Example 2

A 1-liter flask, with a heating mantle, mechanical stirrer, reflux condenser, dip tube, j-chem controller and thermocouple, and caustic scrubber was charged with diethyl phosphinic acid (469 g, 3.84 mol). The flask was heated to 80° C. and ethylene oxide from a pressurized cylinder was charged into the reactor through the dip tube over five hours. Final molar ratio of ethylene oxide to diethyl phosphinic acid was 1.33. The reaction mixture was kept at 80° C. for additional three hours. Further nitrogen was passed through the dip tube to remove the excess ethylene oxide. A batch distillation of the residue was done at 150° C. and 200 mTorr resulting in a clear liquid (400 g). The product was 2-hydroxyethyl ester of diethyl phosphinic acid, $^{31}$P NMR (CDCl$_3$, ppm): 79; and had an acid # of 0.4 mg KOH/g.

Application Example 3

MVSS 302 Test: This test is a horizontal flame test that is used as a guideline for automobile manufactures. The sample size was 14"×4"×½". There is a line 1¼" from the ignition point. A flame was ignited for fifteen seconds. The ignition source was then turned off and the sample was rated. A "DNI" rating indicates that the sample did not support combustion ("did not ignite"). A rating of "SE" indicates that the sample ignited but did not burn to the timing zone, which is a point starting from the 1½" mark to the 3½" line. A rating of "SENBR" indicates that the sample burned past the 1½" line but was extinguished before the 3½" mark. A rating of "SE/B" indicates that a sample burned past the 3½" mark but was extinguished before the endpoint. An inch per minute rate was then calculated. The burn rate indicates that a sample burned passed the 3½" mark. An indication of a burn rate or an SE/B rating that was higher than 4.0 in/min indicates failure in accordance with this test. For this study a minimum performance of SENBR was required.

COMPRESSION SET 90% was determined according to ASTM D3574.

Materials:

Desmophen 60WB01 is a polyester polyol available from Covestro.

BPPE and BPPE-HP are butylated triaryl phosphates available from ICL-IP America.

BDP is bisphenol-A bis(diphenyl phosphate) available from ICL-IP America.

TBEP is a tris(2-butoxyethyl) phosphate available from ICL-IP America.

ADP is an isodecyl diphenyl phosphate available from ICL-IP America.

Niax C-131NPF is an amine catalyst available from Momentive.

Niax DMP is an amine catalyst available from Momentive.

Niax L-537XF is a silicone stabilizer available from Momentive.

TD 80 is an isocyanate material available from BASF.

TD 65 is an isocyanate material available from Covestro.

A/B ratio is the ratio of TDI to the rest of the formulation ingredients.

RPE (reactive phosphinate ester of the invention) which is the reactive phosphinate ester produced in Preparation Example 1 above, is used in the Application Examples 3 and 4 herein below, which RPE showed high efficiency in the MVSS 302 test shown above, passing with a SE rating at only 4 parts in a 1.8 pcf density polyurethane foam. Butylated triaryl phosphate ester products like BPPE and BPPE-HP (low TPP content version) require 10 parts to pass with a SE rating. A bisphosphate product like BDP requires 12 parts to pass with a SENBR rating. It was unexpectedly found that a 20/80 blend of RPE and a phosphate ester like the BPPE type products could also pass the MVSS 302 with a SE rating at only 4 parts, and a similar blend with a bisphosphate like BDP could pass with a SENBR rating at the same loading. These blends have similar efficiency to 4 parts of RPE and only contain 0.8 parts of the high efficiency reactive FR product. The majority of each blend consist of the low efficiency phosphate ester products BPPE and BDP. Even 6 parts of a 20/80 blend of RPE and a phosphate ester like TBEP passes with a SE rating. 8 parts of a 20/80 blend of RPE and a phosphate ester like isodecyl diphenyl phosphate passes with a SENBR rating.

Since it is unrealistic to expect such high FR efficiency from such a low level of the RPE (0.8 parts) in the presence of low efficiency phosphate ester products (3.2 parts), it is clear there is a synergistic relationship between the reactive phosphinate ester product RPE and various phosphate esters. The phosphinate/phosphate ester blends shown below contain 30-35% less phosphorus than the RPE product and still retain the same FR efficiency. It is also clear from the latter two examples shown in the table in Application Example 3 herein below, where RPE is blended with the trialkyl phosphate ester product TBEP and ADP product that this synergistic property extends to a variety of phosphate ester products.

In addition to holding the flammability performance at a high level with these RPE/phosphate ester blends, it is important to note that the physical properties of the resulting foams (e.g., compression set) are greatly improved over what is observed using the RPE product alone. Reactive flame retardant products are known to disrupt the normal foam-forming process, resulting in poor foam physical properties. In most cases this is easily observed by a loss of the foam's ability to recover after compression at an elevated temperature. Compression set testing according to ASTM D3574 is a common foam requirement, and ensures compressed foam will indeed rebound. By using a small amount of the RPE product in the phosphinate/phosphate ester blends, the negative effects of using a reactive FR product can be avoided while at the same time retaining the high FR efficiency required in the end use application. The RPE/phosphate ester blends retain both excellent FR performance and also good physical properties.

| | | | Comp Ex #1 | Comp Ex #2 | Comp Ex #3 | Comp Ex #4 | Example #1 | Example #2 | Example #3 | Comp Ex #5 | Comp Ex #6 |
|---|---|---|---|---|---|---|---|---|---|---|---|
| | | | | | | | FR Used | | | | |
| | OH # | % P | BPPE | BPPE-HP | BDP | RPE | BPPE/RPE | BPPE-HP/RPE | BDP/RPE | TBEP/RPE | ADP/RPE |
| Desmophen 60WB01 | 60 | | 100 | 100 | 100 | 100 | 100 | 100 | 100 | 100 | 100 |
| BPPE | | 8.5 | 10.0 | | | | | | | | |
| BPPE-HP | | 7.9 | | 10.0 | | | | | | | |
| BDP | | 8.9 | | | 12.0 | | | | | | |
| RPE | 410 | 14.7 | | | | 4.0 | | | | | |
| BPPE/RPE (80/20) | 82 | 9.7 | | | | | 4.0 | | | | |
| BPPE-HP/RPE (80/20) | 82 | 9.3 | | | | | | 4.0 | | | |
| BDP/RPE (80/20) | 82 | 10.1 | | | | | | | 4.0 | | |
| TBEP/RPE (80/20) | 82 | 9.2 | | | | | | | | 6.0 | |
| ADP/RPE (80/20) | 82 | 9.3 | | | | | | | | | 8.0 |
| Niax C-131NPF | 0 | — | 1.1 | 1.1 | 1.1 | 1.1 | 1.1 | 1.1 | 1.1 | 1.1 | 1.1 |
| Niax DMP | 0 | — | 0.2 | 0.2 | 0.2 | 0.2 | 0.2 | 0.2 | 0.2 | 0.2 | 0.2 |
| Niax L-537XF | 0 | — | 1.3 | 1.3 | 1.3 | 1.3 | 1.3 | 1.3 | 1.3 | 1.3 | 1.3 |
| Water | 6233 | — | 4.0 | 4.0 | 4.0 | 4.0 | 4.0 | 4.0 | 4.0 | 4.0 | 4.0 |
| Total | | | 116.6 | 116.6 | 118.6 | 110.6 | 110.6 | 110.6 | 110.6 | 112.6 | 114.6 |
| A-side: TD 80 | | | 18.8 | 18.8 | 18.8 | 19.8 | 19.0 | 19.0 | 19.0 | 19.1 | 19.2 |
| A-side: TD 65 | | | 28.2 | 28.2 | 28.2 | 29.7 | 28.5 | 28.5 | 28.5 | 28.7 | 28.8 |

-continued

|  |  | Comp Ex #1 | Comp Ex #2 | Comp Ex #3 | Comp Ex #4 | Example #1 | Example #2 | Example #3 | Comp Ex #5 | Comp Ex #6 |
|---|---|---|---|---|---|---|---|---|---|---|
|  | OH # / % P | BPPE | BPPE-HP | BDP | RPE | BPPE/RPE | BPPE-HP/RPE | BDP/RPE | TBEP/RPE | ADP/RPE |
| Index |  | 98 | 98 | 98 | 98 | 98 | 98 | 98 | 98 | 98 |
| A/B Wt Ratio |  | 0.40 | 0.40 | 0.40 | 0.45 | 0.43 | 0.43 | 0.43 | 0.42 | 0.42 |
| % P in the foam |  | 0.52 | 0.48 | 0.65 | 0.37 | 0.25 | 0.24 | 0.26 | 0.34 | 0.46 |
| Observations |  |  |  |  |  |  |  |  |  |  |
| Lab Temp | deg F. or C. | 75 | 75 | 75 | 75 | 75 | 75 | 75 | 75 | 75 |
| Crm time | sec | 8 | 8 | 7 | 7 | 7 | 7 | 7 | 7 | 7 |
| Blow off/End of Rise | sec | 76 | 81 | 77 | 63 | 69 | 68 | 69 | 73 | 75 |
| Blow off spots |  | multiple | multiple | multiple | multiple | multiple | multiple | multiple | multiple | multiple |
| Sighback |  | No | No | No | No | No | No | No | No | No |
| Physical Performance |  |  |  |  |  |  |  |  |  |  |
| Air flow | scfm | 0.6 | 0.7 | 0.7 | 0.6 | 0.6 | 0.5 | 0.7 | 0.5 | 0.9 |
| Density | pcf | 2.02 | 2.11 | 2.20 | 1.99 | 1.85 | 1.88 | 1.82 | 1.96 | 1.93 |
| 90% Compression Set | % | 46 | 45 | 26 | 67 | 32 | 36 | 21 | 40 | 21 |
| Fire Performance |  |  |  |  |  |  |  |  |  |  |
| MVSS-302 |  | SE | SE | SENBR | SE | SE | SE | SENBR | SE | SENBR |

Application Example 4

Formulations

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
|  |  |  |  |  |  |  | FR Used |  |  |  |  |
|  | OH # | % P | BPPE | BPPE/RPE (80/20) | BPPE/RPE (60/40) | BPPE/RPE (40/60) | RPE | BDP | BDP/RPE (80/20) | BDP/RPE (60/40) | BDP/RPE (40/60) |
| Desmophen 60WB01 | 60 |  | 100 | 100 | 100 | 100 | 100 | 100 | 100 | 100 | 100 |
| BPPE |  | 8.5 | 10 |  |  |  |  |  |  |  |  |
| BPPE/RPE (80/20) | 73 | 10 |  | 4 |  |  |  |  |  |  |  |
| BPPE/RPE (60/40) | 146 | 11.5 |  |  | 4 |  |  |  |  |  |  |
| BPPE/RPE (40/60) | 219 | 12.9 |  |  |  | 4 |  |  |  |  |  |
| RPE | 365 | 15.9 |  |  |  |  | 4 |  |  |  |  |
| BDP |  | 8.9 |  |  |  |  |  | 12 |  |  |  |
| BDP/RPE (80/20) | 73 | 10.3 |  |  |  |  |  |  | 4 |  |  |
| BDP/RPE (60/40) | 146 | 11.7 |  |  |  |  |  |  |  | 4 |  |
| BDP/RPE (40/60) | 219 | 13.1 |  |  |  |  |  |  |  |  | 4 |
| Niax C-131NPF | 0 | — | 1.1 | 1.1 | 1.1 | 1.1 | 1.1 | 1.1 | 1.1 | 1.1 | 1.1 |
| Niax DMP | 0 | — | 0.2 | 0.2 | 0.2 | 0.2 | 0.2 | 0.2 | 0.2 | 0.2 | 0.2 |
| Niax L-537XF | 0 | — | 1.30 | 1.30 | 1.30 | 1.30 | 1.30 | 1.30 | 1.30 | 1.30 | 1.30 |
| Water | 6233 | — | 4 | 4 | 4 | 4 | 4 | 4 | 4 | 4 | 4 |
| Total |  |  | 116.6 | 110.6 | 110.6 | 110.6 | 110.6 | 118.6 | 110.6 | 110.6 | 110.6 |
| A-side: TD 80 |  |  | 18.8 | 19 | 19.2 | 19.4 | 19.7 | 18.8 | 19 | 19.2 | 19.4 |
| A-side: TD 65 |  |  | 28.2 | 28.5 | 28.8 | 29 | 29.6 | 28.2 | 28.5 | 28.8 | 29 |
| Index |  |  | 98 | 98 | 98 | 98 | 98 | 98 | 98 | 98 | 98 |
| A/B Wt Ratio |  |  | 0.40 | 0.43 | 0.43 | 0.44 | 0.45 | 0.40 | 0.43 | 0.43 | 0.44 |
| % P in the foam |  |  | 0.55 | 0.27 | 0.31 | 0.35 | 0.42 | 0.69 | 0.28 | 0.31 | 0.35 |
| Observations |  |  |  |  |  |  |  |  |  |  |  |
| Lab Temp | deg F. or C. |  | 75 | 75 | 75 | 75 | 75 | 75 | 75 | 75 | 75 |
| Crm time | sec |  | 8 | 7 | 6 | 6 | 7 | 7 | 8 | 7 | 7 |
| Blow off/End of Rise | sec |  | 76 | 68 | 67 | 70 | 65 | 77 | 70 | 70 | 66 |
| Blow off spots |  |  | multiple | multiple | multiple | multiple | multiple | multiple | multiple | multiple | multiple |
| Sighback |  |  | No | No | No | No | No | No | No | No | No |
| Physical Performance |  |  |  |  |  |  |  |  |  |  |  |
| Air flow | scfm |  | 0.6 | 0.8 | 0.6 | 0.5 | 0.8 | 0.7 | 0.4 | 0.6 | 0.7 |
| Density | pcf |  | 2.02 | 1.85 | 1.87 | 1.86 | 1.82 | 2.20 | 1.90 | 1.83 | 1.83 |
| Fire Performance |  |  |  |  |  |  |  |  |  |  |  |
| MVSS-302 |  |  | SE | SE | SE | SE | SE | SENBR | SENBR | SENBR | SE |

Summary Illustrating Synergy

See FIG. 1 for below table

| RPE/BPPE Blends | | | | | |
|---|---|---|---|---|---|
| Percentage of Reactive in Blend | 0 | 20 | 40 | 60 | 100 |
| FR Loading in Foam (pph) | 10 | 4 | 4 | 4 | 4 |
| MVSS 302 Rating | SE | SE | SE | SE | SE |
| FR loading needed to pass MVSS 302 with a SE rating | | | | | |

See FIG. 2 for below table

| RPE/BDP Blends | | | | | |
|---|---|---|---|---|---|
| Percentage of Reactive in Blend | 0 | 20 | 40 | 60 | 100 |
| FR Loading in Foam (pph) | 12 | 4 | 4 | 4 | 4 |
| MVSS 302 Rating | SENBR | SENBR | SENBR | SE | SE |
| FR loading needed to pass MVSS 302 with a SENBR or better rating | | | | | |

Figure 1:
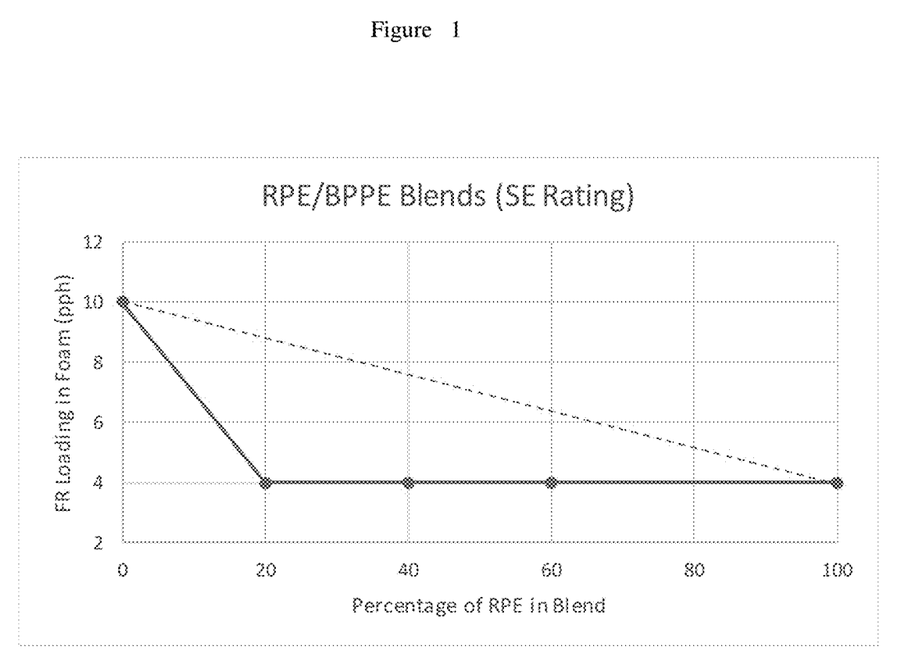
FIG. 1 is a graphical depiction of the first set of data in Application Example 4, i.e., RPE/BPPE blends.
Figure 2:
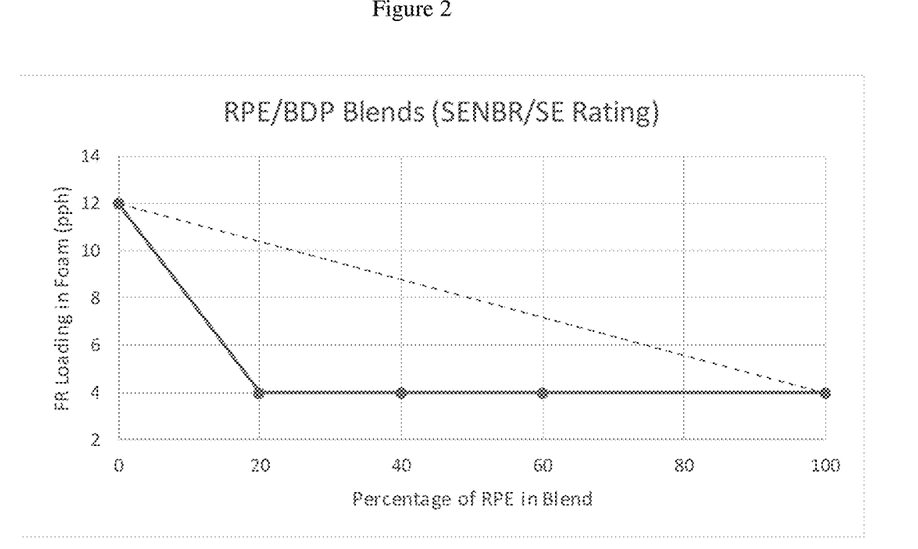
FIG. 2 is a graphical depiction of the second set of data in Application Example 4, i.e., RPE/BDP blends.

The straight dotted lines in both FIG. 1 and FIG. 2 is the level of flame retardant loading one would expect based on a simple linear relationship between the two flame retardants described therein if no synergy was present. Any points below the dotted line (the solid line) in each of FIGS. 1 and 2 provide evidence that much less flame retardant was needed than would be expected based on the simple linear relationship between the passing levels for the two flame retardant products. The fact the blends require less flame retardant than would be expected is evidence of a synergistic relationship between the two flame retardants in the blend.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A flame retardant blend comprising:

(1) a mono-hydroxyl-functional dialkyl phosphinate compound of the formula (I-A):

(I-A)

wherein:

$R^1$ and $R^2$ are selected from a linear or branched alkyl group containing from 1 to 4 carbon atoms; and, X is either and when X is $-----(Z)_k-R^3$, wherein $-(Y-O)_n-$, is a linear or branched alkylene group containing from 2 to 8 carbon atoms and n represents an integer from 1 to 20;

k may be 0 or 1;

$R^3$ is selected from hydrogen, a mono-hydroxy-terminated linear or branched alkylene group containing from 2 to about 8 carbon atoms; and, provided that when k is zero, $R^3$ is the mono-hydroxy-terminated linear or branched alkylene group and when k is 1, $R^3$ is hydrogen, and when X is $R^4$ and $R^5$ are each independently selected from H, a linear or branched alkyl group containing from 1 to 8 carbon atoms, a linear or branched alkenyl group containing from 2 to 8 carbon atoms, a halo-substituted alkyl group containing from 1 to 8 carbon atoms, an alkoxy group containing from 1 to 8 carbon atoms, an aryl group containing from 6 to 12 carbon atoms and an alkylaryl group containing from 7 to 16 carbon atoms, or $R^4$ and $R^5$ are bonded to each other to form a cycloalkyl group containing from 5 to about 8 carbon atoms; and, (2) a phosphate compound.

2. The flame-retardant blend of claim 1, wherein $R^1$ and $R^2$ are each an ethyl group.

3. The flame-retardant blend of claim 1, wherein the mono-hydroxyl-functional dialkyl phosphinate compound has the formula (I-A-1):

(I-A-1)

4. The flame-retardant blend of claim 3, wherein $R^1$ and $R^2$ are each an ethyl group.

5. The flame-retardant blend of claim 1 wherein the mono-hydroxyl-functional dialkyl phosphinate compound has the formula (I-A-2):

(I-A-2)

6. The flame-retardant blend of claim 5, wherein $R^1$ and $R^2$ are each an ethyl group.

7. The flame retardant blend of claim 1 wherein the phosphate compound is selected from the group consisting of mixed t-butylphenyl phenyl phosphates, resorcinol bis (diphenyl phosphate), bisphenol A bis(diphenyl phosphate), tris (2-butoxyethylphosphate), and combinations thereof.

8. The flame retardant blend of claim 1 further comprising a halogenated phosphate compound selected from the group consisting of tris(1,3-dichloro-2-propyl) phosphate (TDCP); phosphoric acid esters, oxydi-2,1-ethanediyl tetrakis (2-chloro-1-methylethyl) ester; Amgard V6 (2,2-bis(Chloromethyl)-1,3-propanediyl tetrakis(2-chloroethyl) Ester Phosphoric Acid); ELF-800 (2,2-bis(Chloromethyl)-1,3-propanediyl tetrakis(2-chloro-1-methylethyl) Ester Phosphoric Acid); and combinations thereof.

9. A flame-retarded flexible polyurethane foam comprising the reaction product of a polyol, an isocyanate and a flame retardant-effective amount of the flame-retardant blend of claim 1.

10. An article comprising the polyurethane foam of claim 9.

11. An application comprising the article of claim 10, wherein the application is selected from the group consisting of furniture applications, automotive applications, boating applications, bus seating applications, train seating applications, RV seating applications, office furniture seating applications, aviation applications, tractor applications, bicycle applications, engine mount applications, compressor applications, bedding applications, insulation applications, sporting goods applications, shoe applications, carpet cushioning applications, packaging applications, textile applications, buffer cushioning applications, HVAC applications, tent applications, life raft applications, luggage applications, and hand bag applications, which comprises the flexible polyurethane of claim 1.

12. The furniture application of claim 11, which is upholstered furniture.

13. The automotive application of claim 11, which is selected from the group consisting of automotive seat cushions, head linings and head rests, back cushions for automobiles and trucks, bus seating, vehicle seat bottom and back bolsters, armrests, support rings for run flat tires, and other automobile interior components.

14. The bedding application of claim 11 which is selected from the group consisting of mattresses and mattress top applications.

15. The insulation application of claim 11, which is a sound insulation material.

* * * * *